US008783288B2

(12) United States Patent
Lin

(10) Patent No.: US 8,783,288 B2

(45) Date of Patent: Jul. 22, 2014

(54) SIDESPRAY HAVING VOLUME CONTROL

(75) Inventor: James Lin, Aliso Viejo, CA (US)

(73) Assignee: Price Pfister, Inc., Lake Forest, CA (US)

( * ) Notice: Subject to any disclaimer, the term of this patent is extended or adjusted under 35 U.S.C. 154(b) by 478 days.

(21) Appl. No.: 12/911,795

(22) Filed: Oct. 26, 2010

(65) Prior Publication Data

US 2012/0097766 A1 Apr. 26, 2012

(51) Int. Cl.

*F16K 11/20* (2006.01)
*F16K 47/08* (2006.01)
*B05B 1/30* (2006.01)

(52) U.S. Cl.

USPC ......... 137/597; 137/625.3; 239/396; 239/525

(58) Field of Classification Search

USPC .................... 137/119.01, 119.04, 597, 625.3; 239/11, 396, 428.5, 447, 449

See application file for complete search history.

(56) References Cited

U.S. PATENT DOCUMENTS

| | | | | |
|---|---|---|---|---|
| 5,806,771 | A | 9/1998 | Loschelder et al. | |
| 5,971,299 | A | 10/1999 | Loschelder et al. | |
| 6,920,892 | B2 | 7/2005 | Agresta et al. | |
| 7,077,153 | B2 | 7/2006 | Segien, Jr. | |
| 7,494,074 | B2 * | 2/2009 | Benstead | 239/449 |
| 2009/0200401 | A1 * | 8/2009 | Esche et al. | 239/525 |

* cited by examiner

*Primary Examiner* — Stephen M Hepperle
*Assistant Examiner* — Kevin Barss
(74) *Attorney, Agent, or Firm* — Barnes & Thornburg LLP

(57) ABSTRACT

A sidespray for use with a water faucet unit includes a trigger valve and a volume control valve. The trigger valve is configured to define a full-ON water flow condition and a full-OFF water flow condition for the sidespray. A diverter actuator is coupled to the trigger valve to select between the full-ON water flow condition and the full-OFF water flow condition for the sidespray. The volume control valve is configured to define a volume-variable water passageway to limit a water flow volume through the sidespray when the trigger valve has set the sidespray to the full-ON water flow condition. A volume control actuator is coupled to the volume control valve to selectively adjust the water flow volume through the sidespray.

28 Claims, 8 Drawing Sheets

SIDESPRAY HAVING VOLUME CONTROL

CROSS-REFERENCE TO RELATED APPLICATIONS

None

BACKGROUND OF THE INVENTION

1. Field of the Invention

The present invention relates to water faucets, and, more particularly, to a sidespray having volume control for use with a water faucet unit.

2. Description of the Related Art

Kitchen faucets are often provided with a water mixer valve assembly connected to a faucet spout and connected to a retractable sidespray. The faucet spout/sidespray arrangement provides a user with the option using the faucet spout having a limited range of nozzle motion relative to the sink, and the retractable sidespray that provides for a full range of motion of the sidespray nozzle due to the flexible conduit connecting the sidespray to the mixer valve assembly. Thus, for example, the sidespray may permit an upward spray, and also accommodates the washing of large pots and pans which would not normally fit under the faucet spout. When operating a sidespray, a diverter valve is provided to divert all of the water flow from the faucet spout and direct the water flow to the sidespray.

Thus, upon actuation of the sidespray by the user, the diverter valve senses water flowing to the sidespray outlet, and a differential pressure causes the diverter valve to direct all water flow to the sidespray and shut off the water flow to the faucet spout. Further, in such an arrangement, at the sidespray the user is limited to controlling the water flow as either full-ON or full-OFF.

SUMMARY OF THE INVENTION

The present invention provides a sidespray having volume control for use with a water faucet unit.

The invention, in one form thereof, is directed to a sidespray for use with a water faucet unit that includes a trigger valve and a volume control valve. The trigger valve is configured to define a full-ON water flow condition and a full-OFF water flow condition for the sidespray. A diverter actuator is coupled to the trigger valve to select between the full-ON water flow condition and the full-OFF water flow condition for the sidespray. The volume control valve is configured to define a volume-variable water passageway to limit a water flow volume through the sidespray when the trigger valve has set the sidespray to the full-ON water flow condition. A volume control actuator is coupled to the volume control valve to selectively adjust the water flow volume through the sidespray.

The invention, in another form thereof, is directed to a sidespray for use with a water faucet unit. The sidespray includes a sidespray housing having a proximal end, a distal end, and a side wall that extends between the proximal end and the distal end. The side wall defines a first chamber. The side wall has a side opening extending through the side wall to the first chamber. The proximal end is configured to accommodate fluid communication with the water faucet unit. A nozzle is coupled to the first chamber at the distal end of the sidespray housing. A volume control actuator is positioned to extend through the side opening in the side wall to be accessible at an exterior of the sidespray housing. A volume control valve is positioned in the first chamber of the sidespray housing. The volume control valve includes a rotary body positioned in the first chamber. The rotary body includes a rotational disk and a hub. The rotary body is rotatably mounted to the sidespray housing via the hub. The rotational disk has a first opening. The volume control actuator is coupled to the hub to effect rotation of the rotational disk relative to the sidespray housing. A rotationally stationary body is positioned in the first chamber. The rotationally stationary body includes a rotationally stationary disk having a second opening. The rotationally stationary disk is positioned adjacent to the rotational disk of the rotary body. The first opening of the rotational disk and the second opening of the rotationally stationary disk cooperate to define a volume-variable water passageway.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION OF THE INVENTION

Figure 1:
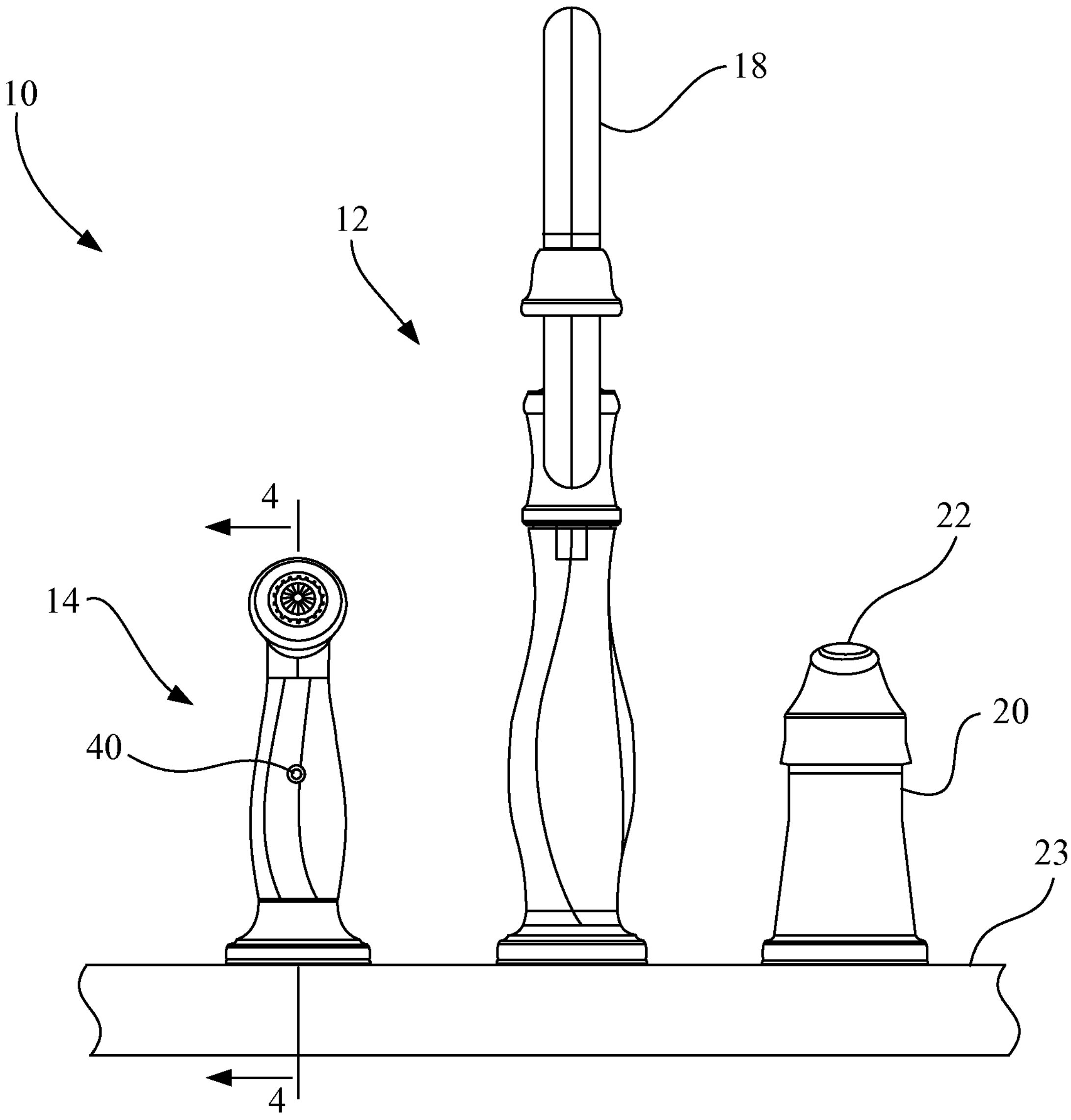
FIG. 1 is a front view of a water faucet system embodying the present invention.

Referring now to the drawings and particularly to FIG. 1, there is shown a water faucet system 10 embodying the present invention. Water faucet system 10 includes a water faucet unit 12 and a sidespray 14.

Figure 2:
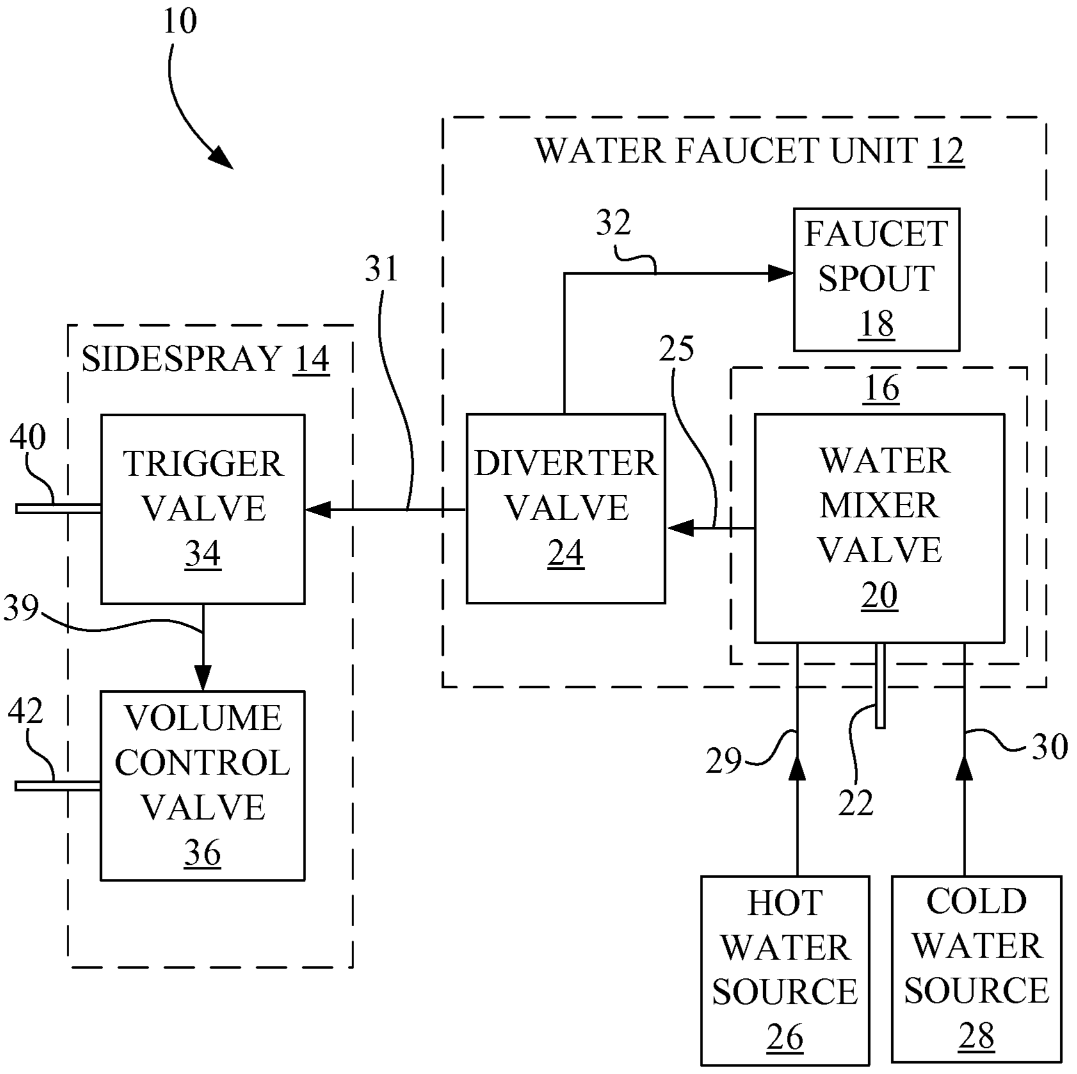
FIG. 2 is a schematic diagram of the water faucet system of FIG. 1.

Referring also to the schematic diagram of FIG. 2, in the present embodiment water faucet unit 12 includes a water mixing assembly 16 and a faucet spout 18. Water mixing assembly 16 has a water mixer valve 20 and associated plumbing hardware. Water mixer valve 20 is controllably connected to a single control handle 22, as shown in FIG. 1. However, those skilled in the art will recognize that water mixing assembly 16 may be formed by separate hot and cold water valves coupled in fluid communication with a water mixing chamber, with the separate hot and cold water valves supplying a respective flow of hot water and cold water to the mixing chamber. In the embodiment shown in FIG. 1, faucet spout 18 and water mixer valve 20 are fixedly mounted to a countertop 23, and sidespray 14 is removably mounted to countertop 23.

Water mixing assembly 16 is configured to provide a flow of mixed water (hot and cold water mixed to the desired temperature) to one of sidespray 14 and faucet spout 18 via a diverter valve 24. In the present embodiment, diverter valve 24 is coupled in fluid communication with water mixer valve 20 via a conduit 25. However, those skilled in the art will recognize that alternatively diverter valve 24 may be incorporated into the output of water mixer valve 20.

In the present embodiment water, water mixer valve 20 is configured for connection to a hot water source 26 and a cold water source 28 via conduits 29, 30. Diverter valve 24 is interposed between, and is in fluid communication with, sidespray 14 and faucet spout 18 via conduit 31 and conduit 32, respectively. As is typical in the art, conduit 31 may be a retractable flexible hose. Diverter valve 24 is configured to direct the flow of mixed water to one of sidespray 14 and faucet spout 18 of water faucet unit 12. A default position of diverter valve 24 is to supply the flow of mixed water to faucet spout 18 via conduit 32. However, when diverter valve 24 is actuated, such as by actuating the trigger of sidespray 14, the flow of mixed water is diverted to flow through sidespray 14.

Sidespray 14 includes a trigger valve 34 and a volume control valve 36. Trigger valve 34 is in fluid communication with volume control valve 36 via a fluid passageway 39. In the present embodiment, trigger valve 34 and volume control valve 36 define a serial water pathway through sidespray 14. A diverter actuator 40 is operably coupled to trigger valve 34. A volume control actuator 42 is operably coupled to volume control valve 36.

Accordingly, in the embodiment of water faucet system 10 depicted in FIG. 2, diverter valve 24 receives a mixed water flow from water mixing assembly 16. When trigger valve 34 of sidespray 14 is actuated by operation of diverter actuator 40, diverter valve 24 diverts the mixed water flow from faucet spout 18 through trigger valve 34 to volume control valve 36. Thus, trigger valve 34 is configured as a full-ON/full OFF valve to define a full-ON water flow condition and a full-OFF water flow condition for sidespray 14. However, volume control valve 36 allows the user to vary the volume of water that flows through sidespray 14. The user may operate volume control actuator 42 to control volume control valve 36 to adjust, i.e., variably select, the desired water flow volume through sidespray 14.

Figure 3:
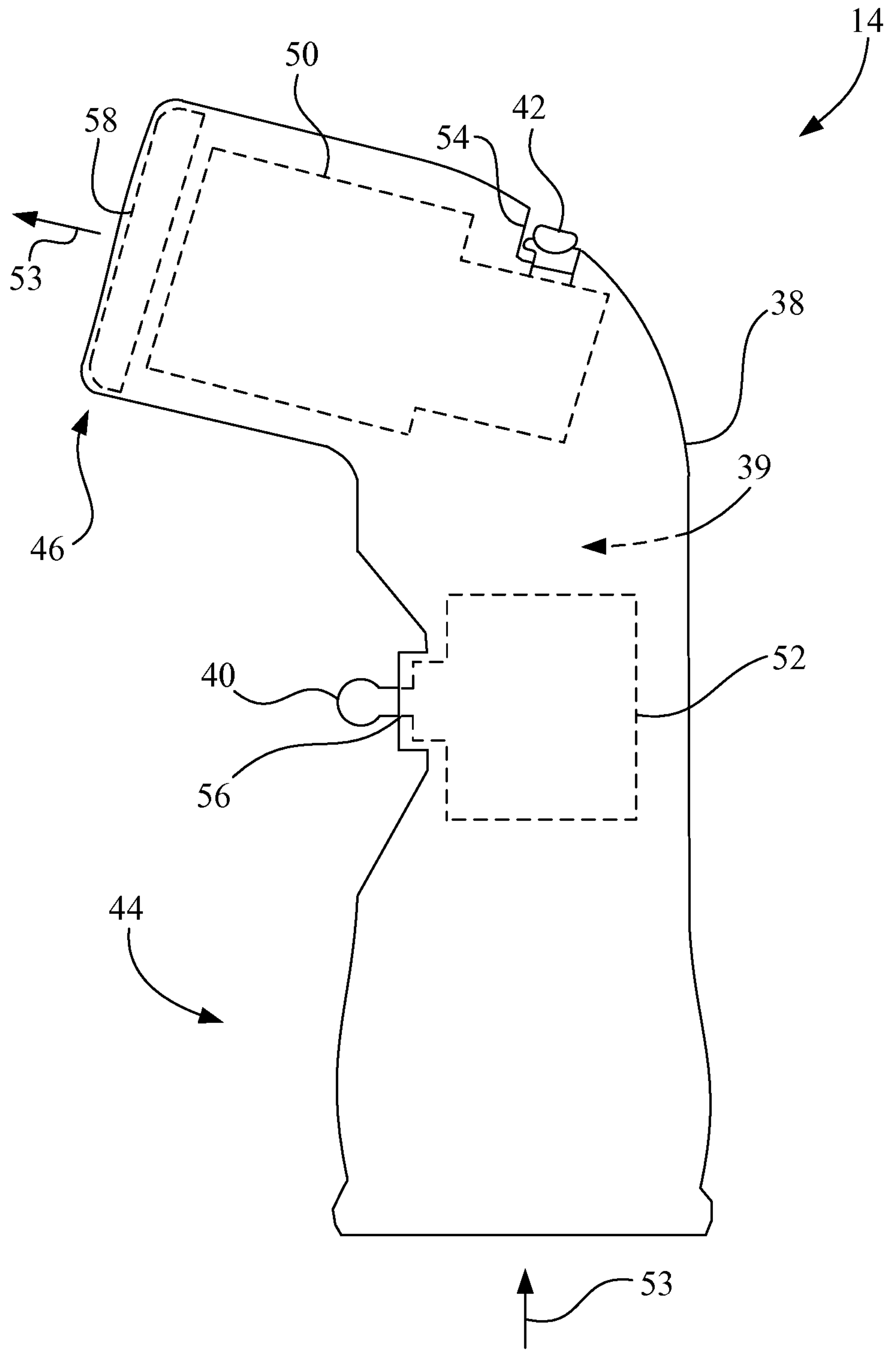
FIG. 3 is a side view of the sidespray of the water faucet system of FIG. 1.
Figure 4:
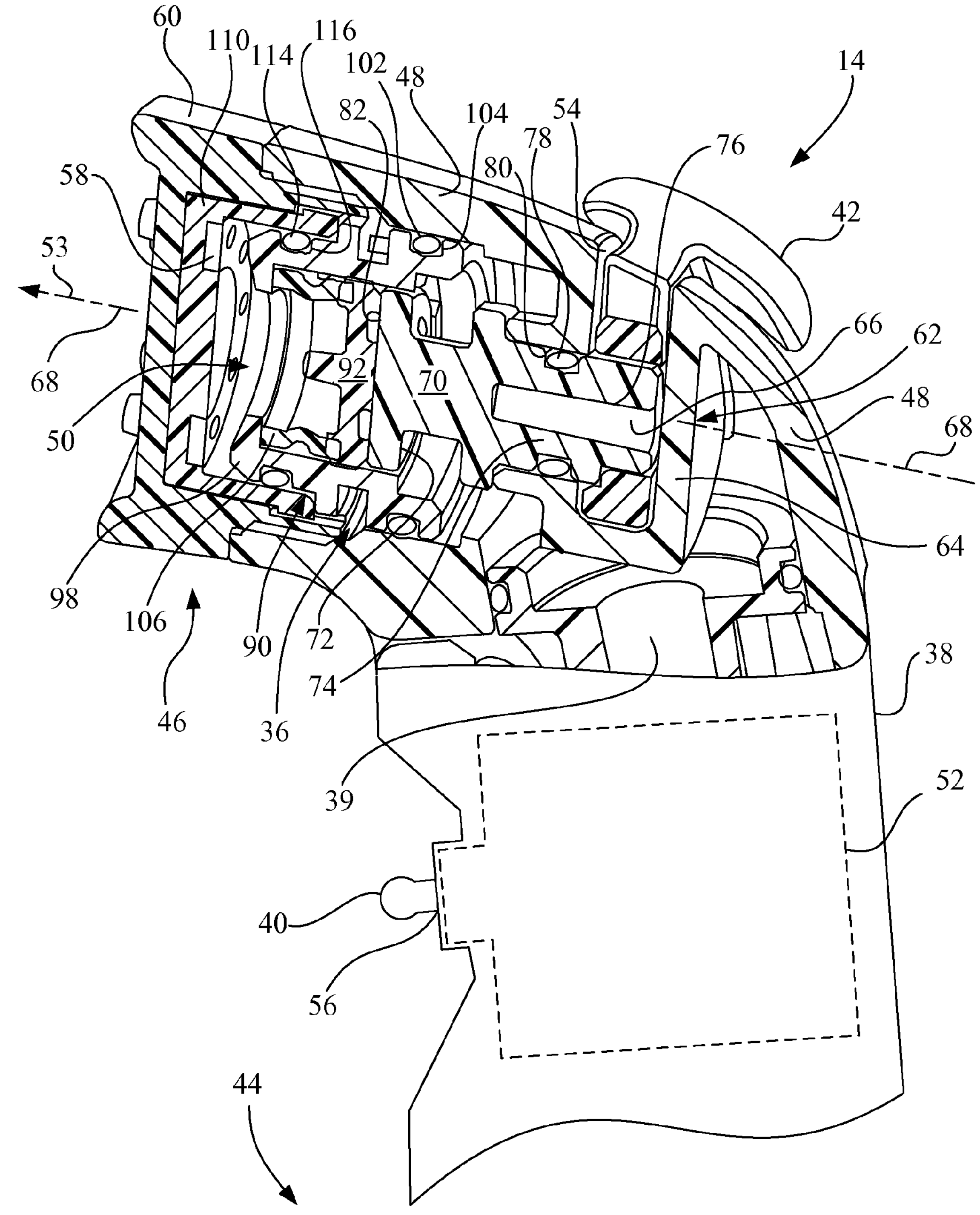
FIG. 4 is a partial section view of the sidespray of the water faucet system of FIG. 1 taken along line 4-4.

Referring to FIGS. 1 and 3, the external features of sidespray 14 include a sidespray housing 38, diverter actuator 40 and volume control actuator 42. Referring now also to FIG. 4, sidespray housing 38 has a proximal end 44 and a distal end 46. Sidespray housing 38 has a side wall 48 that extends between proximal end 44 and distal end 46. Proximal end 44 is configured to be coupled in fluid communication to water faucet unit 12, and more particularly, to water mixing valve 20, e.g., via conduit 31, diverter valve 24, and conduit 25 (see FIG. 2).

Referring to FIGS. 3 and 4, side wall 48 defines within sidespray housing 38 a first chamber 50 and a second chamber 52. First chamber 50 is located immediately upstream of distal end 46 of sidespray housing 38, relative to the water flow direction 53. Second chamber 52 is located between said first chamber 50 and proximal end 44 of sidespray housing 38. Side wall 48 has a side opening 54 that extends through side wall 48 to first chamber 50 to accommodate volume control actuator 42. Side opening 54 may be formed as a slot. Side wall 48 has a side opening 56 that extends through side wall 48 to second chamber 52 to accommodate diverter actuator 40. Side opening 56 may be, for example, an opening that is configured to accommodate a toggle or pushbutton motion of diverter actuator 40. A nozzle 58 having a plurality of spray nozzle openings is coupled in fluid communication with first chamber 50 at a region of sidespray housing 38 near distal end 46. A nozzle body 60 is configured to fixedly engage side wall 48 of sidespray housing 38, e.g., by snap engagement, threaded engagement, etc., to retain nozzle 58 and volume control valve 36 in sidespray housing 38.

Figure 5:
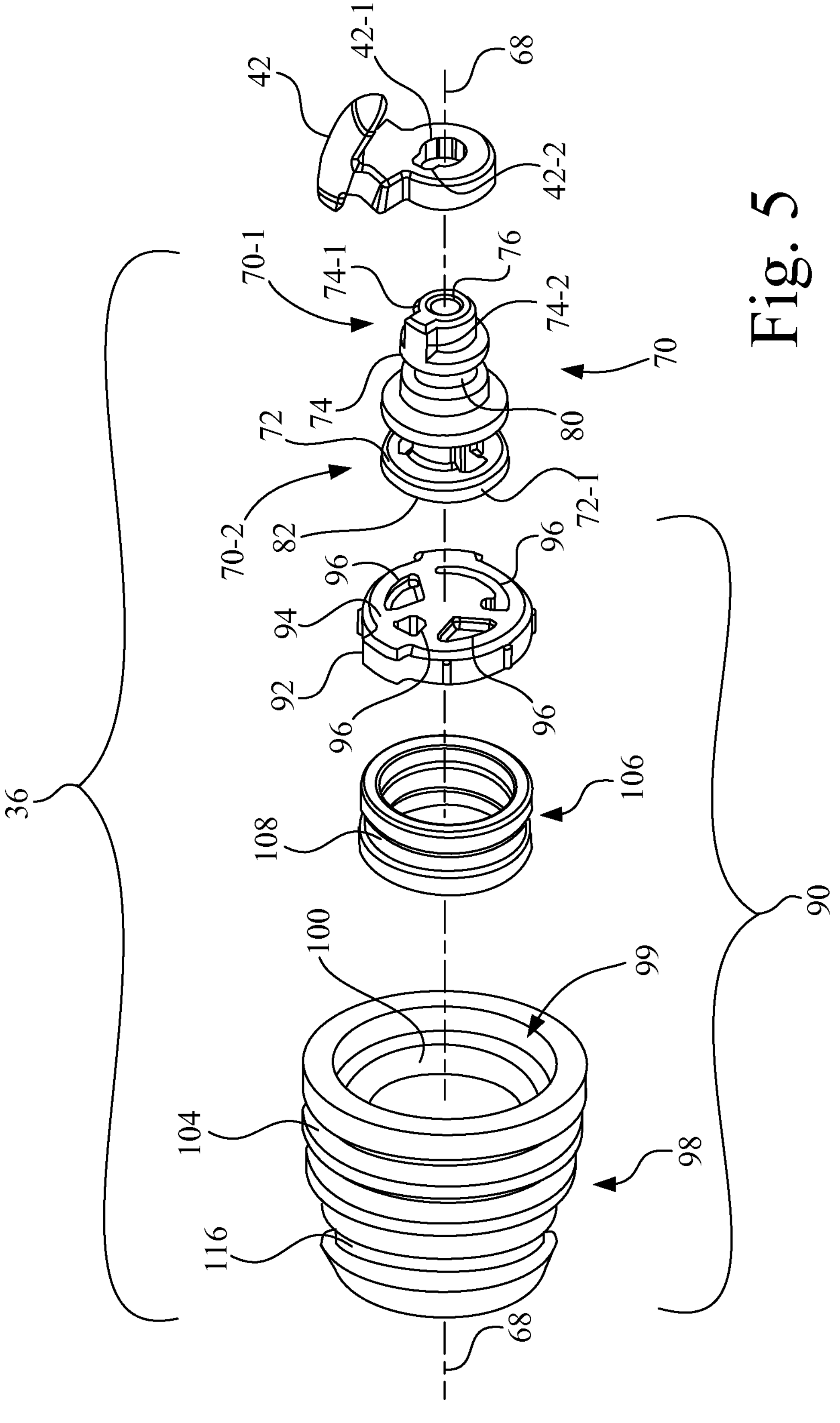
FIG. 5 is an exploded view of an embodiment of a volume control valve of the sidespray of FIG. 4.

FIG. 5 shows an exploded view of an embodiment of a volume control valve 36 of sidespray 14, with the assembled volume control valve 36 being shown is section in FIG. 4. Volume control valve 36 is positioned in first chamber 50 of sidespray housing 38. A cylindrical housing 62 is located in first chamber 50. Cylindrical housing 62 has an end wall 64 and has an axle 66 extending from end wall 64 along an axis 68, i.e., a longitudinal central axis of cylindrical housing 62.

Volume control valve 36 includes a rotary body 70 and a rotationally stationary body 90, each being positioned in first chamber 50. Rotary body 70 and sidespray housing 38 are configured such that rotary body 70 is rotatable relative to sidespray housing 38. Rotationally stationary body 90 and sidespray housing 38 are configured such that rotationally stationary body 90 is not rotatable with respect to sidespray housing 38.

In the present embodiment, rotary body 70 may be molded and/or machined as a discrete unitary part. Rotary body 70 has a proximal portion 70-1 and a distal portion 70-2. The distal portion 70-2 of rotary body 70 includes a rotational disk 72 and the proximal portion of 70-1 of rotary body 70 includes a hub 74. Volume control actuator 42 is connected, e.g., via a keyed arrangement, to the proximal portion of 70-1 of rotary body 70 to effect rotary motion of rotary body 70 relative to sidespray housing 38 about axis 68. Volume control actuator 42 extends substantially radially from hub 74, i.e., from the proximal portion 70-1, of rotary body 70 through side opening 54 in side wall 48 so as to be accessible at an exterior of said sidespray housing 38. Volume control actuator 42 may be in the form of an actuator lever having an opening 42-1 with a key slot 42-2 into which a corresponding structure of a proximal end 74-1 of hub 74 having a radially extending side-key 74-2 is inserted.

Referring to FIG. 4, rotary body 70 is rotatably mounted to sidespray housing via hub 74. More particularly, hub 74 of rotary body 70 is received in cylindrical housing 62, and has an elongated central opening 76 configured to rotatably engage with axle 66 for rotation around axis 68. The exterior of axle 66 and the interior of elongated central opening 76 of hub 74 have a complementary shape, e.g., cylindrical or frustoconical, but are sized relative to one another to provide a mechanical tolerance to accommodate rotation of hub 74 about axle 66. An o-ring seal 78 is positioned between cylindrical housing 62 and hub 74 of rotary body 70, with hub 74 having an annular o-ring groove 80 to receive a portion of o-ring seal 78. O-ring seal 78 is positioned to prevent water leakage to the exterior of sidespray housing 38 via side opening 54.

Figure 6A:
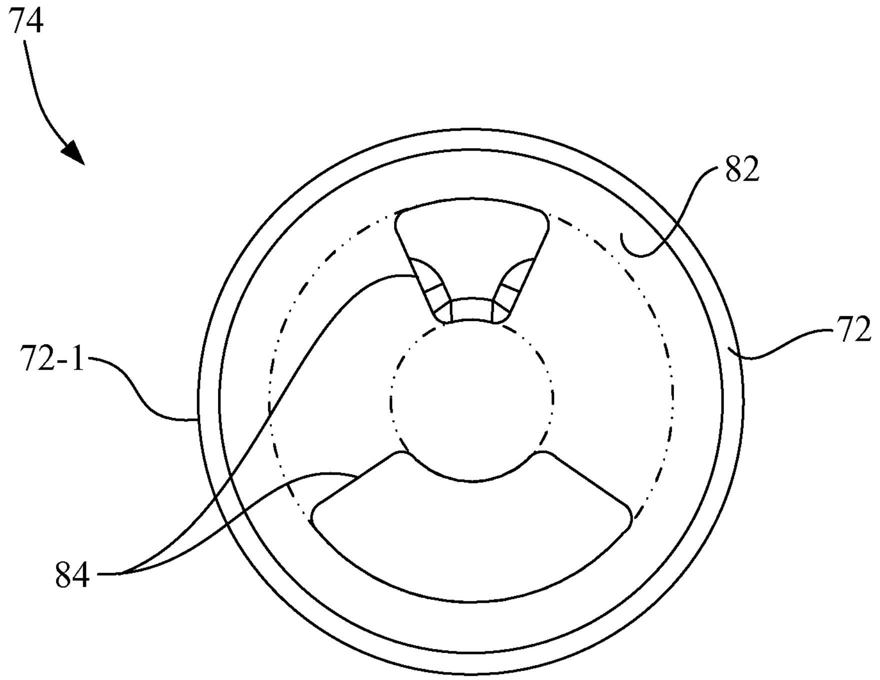
FIG. 6A is a front view of a rotational disk of the volume control valve of the sidespray of FIG. 5.

Referring also to FIG. 6A, rotational disk 72 has a planar surface 82 through which first opening(s) 84 extend to define a fluid channel through rotational disk 72. First opening(s) 84 may be formed as one or more through slots, e.g., as one or more individual arcuate through slots.

Figure 6B:
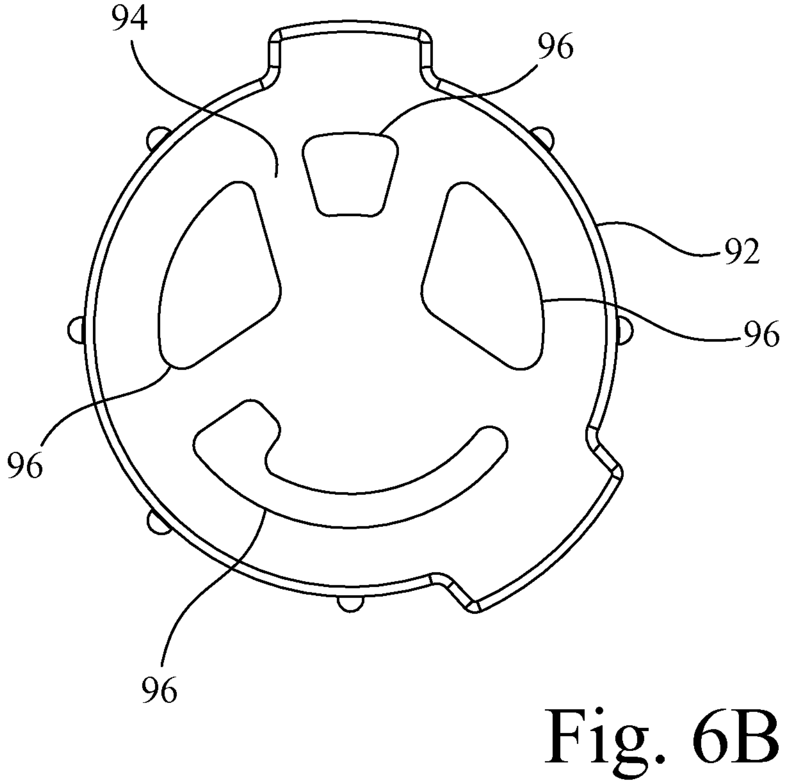
FIG. 6B is a back view of a rotationally stationary disk of the volume control valve of the sidespray of FIG. 5.

Referring again to FIGS. 3-5, rotationally stationary body 90 also is positioned in second chamber 52. Rotationally stationary body 90 includes a rotationally stationary disk 92. Referring also to FIG. 6B, rotationally stationary disk 92 has a planar surface 94 through which second opening(s) 96 extend to define a fluid channel through rotationally stationary disk 92. Second opening(s) 96 may be formed as a through slot, and may be formed as one or more individual arcuate through slots.

Planar surface 94 of rotationally stationary disk 92 of rotationally stationary body 90 is positioned adjacent to planar surface 82 of rotational disk 72 of rotary body 70. Stated differently, planar surface 94 of rotationally stationary disk 92 is positioned to engage planar surface 82 of rotational disk 72 of rotary body 70, with rotary body 70 being rotatably movable relative to rotationally stationary body 90.

In the present embodiment, rotationally stationary body 90 includes a holder body 98, separate from rotationally stationary disk 92. Holder body 98 is positioned in first chamber 50 to orientate rotationally stationary disk 92 relative to rotational disk 72. Holder body 98 includes a multi-tiered opening 99 that includes a cylindrical bearing surface 100 for radially supporting the distal portion 70-2 of rotary body 70 having rotational disk 72. In the present embodiment, for example, a circular circumference 72-1 of rotational disk 72 rotatably engages cylindrical bearing surface 100. As shown in FIG. 4, an o-ring seal 102 is positioned between side wall 48 of sidespray housing 38 and holder body 98, with holder body 98 having a first annular o-ring groove 104 configured to receive o-ring seal 102.

A biasing member 106 is axially positioned between holder body 98 and rotationally stationary disk 92 to bias rotationally stationary disk 92 in contact with rotational disk 72. In the present embodiment, biasing member 106 is formed as a rubber cylinder having an annular thinned region 108 to facilitate the axial compression of biasing member 106 along axis 68.

Referring to FIG. 4, a cylindrical retainer 110 is located at distal end 46 of sidespray housing 38 to mount nozzle 58, and to restrain axial movement of rotationally stationary body 90 and rotary body 70 of volume control valve 36 in water flow direction 53. Cylindrical retainer 110 is configured to be mechanically coupled to side wall 48 of sidespray housing 38, e.g., via nozzle body 60. An o-ring seal 114 is positioned is between cylindrical retainer 110 and holder body 98, with holder body 98 having a second annular o-ring groove 116 configured to receive o-ring seal 114.

Figure 7:
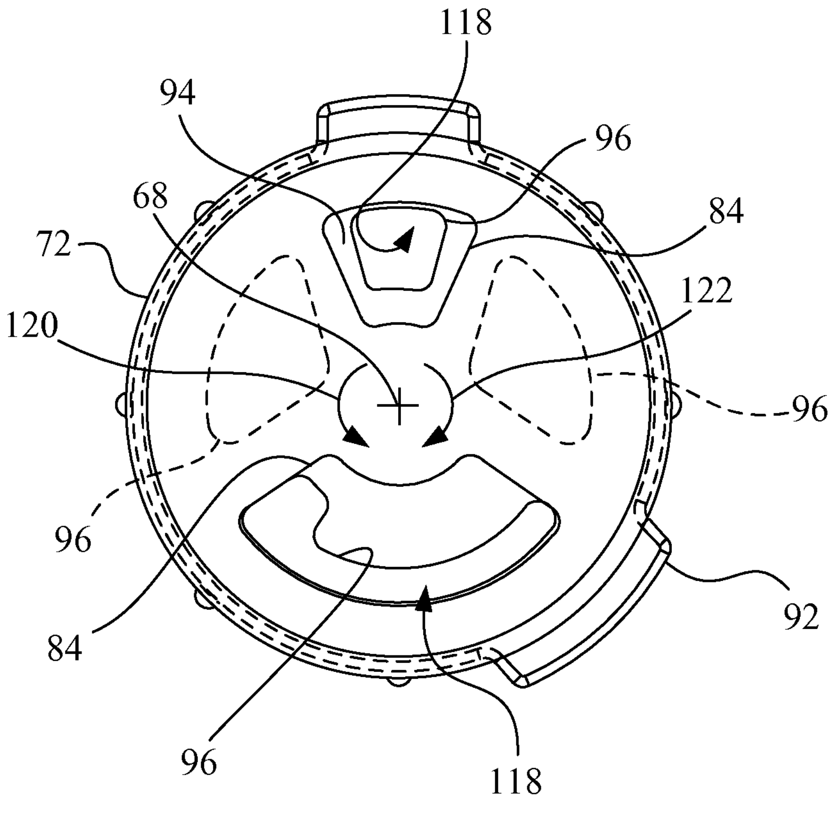
FIG. 7 illustrates how the first opening(s) of the rotational disk of FIG. 6A and the second opening(s) of the rotationally stationary disk of FIG. 6B overlap to define a volume-variable water passageway.

Referring to FIG. 7, there is shown the arrangement of rotational disk 72 and rotationally stationary disk 92, with planar surface 82 of rotational disk 72 facing planar surface 94 of rotationally stationary disk 92. The first opening(s) 84 of rotational disk 72 and second opening(s) 96 of rotationally stationary disk 92 cooperate to define a volume-variable water passageway 118. The volume of water flowing through volume-variable water passageway 118 is varied, e.g., limited, based on an amount of area overlap between first opening(s) 84 of rotational disk 72 and second opening(s) 96 of rotationally stationary disk 92. In the orientation shown in FIG. 7, rotational disk 72 may be rotated in a counterclockwise direction 120 or a clockwise direction 122 relative to rotationally stationary disk 92. The amount of area overlap between first opening(s) 84 of rotational disk 72 and second opening(s) 96 of rotationally stationary disk 92 depends on a rotational position of rotational disk 72 of rotary body 70 relative to rotationally stationary disk 92 of rotationally stationary body 90. The rotational position of rotary body 70 is effected by the user by an arcuate movement of volume control actuator 42 about axis 68 (see FIG. 4).

The amount of overlap between first opening(s) 84 of rotational disk 72 and second opening(s) 96 of rotationally stationary disk 92 is selected to provide a desired water flow volume thorough volume-variable water passageway 118 of about 20 percent to 100 percent, as a percentage of the maximum water flow available through volume-variable water passageway 118 corresponding to the maximum area overlap between first opening(s) 84 of rotational disk 72 and second opening(s) 96 of rotationally stationary disk 92. Thus, in the present embodiment, so as to not trigger a deactivation of diverter valve 24 during volume adjustment of sidespray 14, volume control valve 36 is configured so as not to provide a full-OFF condition at nozzle 58. Rather, trigger valve 34 is used to provide the full-OFF condition at nozzle 58 of sidespray 14 to thus effect deactivation of diverter valve 24 to direct the water flow back to faucet spout 18 (see FIG. 2).

Figure 8:
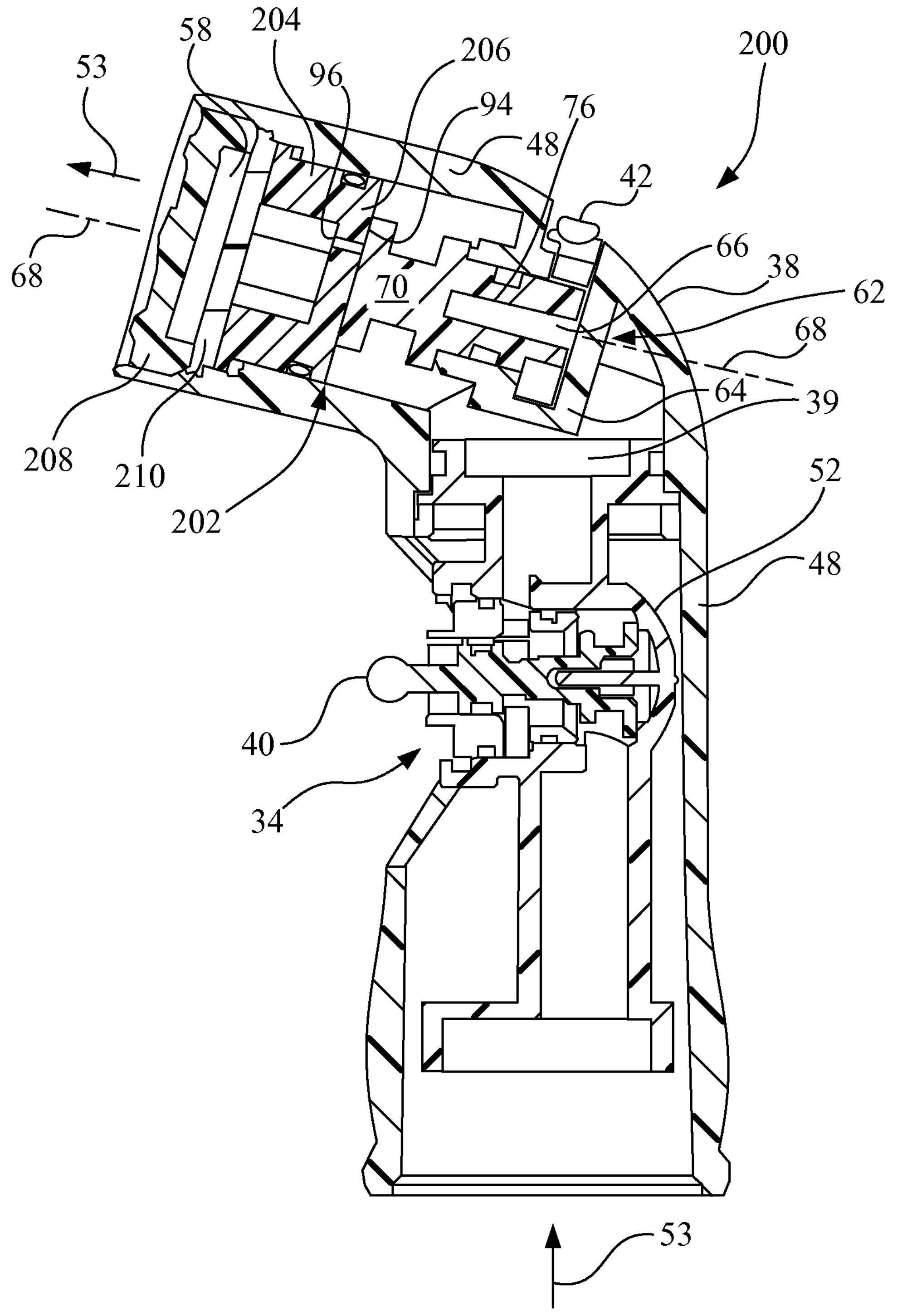
FIG. 8 is a section view of another embodiment of the sidespray of the water faucet system of FIG. 1 taken along line 4-4.

FIG. 8 is another embodiment of a sidespray suitable for use with water faucet system 10, and is referenced as sidespray 200. Components of sidespray 200 common to sidespray 14 share common element numbers, and for brevity, their description will not be repeated here. The primary difference between sidespray 200 in comparison to sidespray 14 is that in the embodiment of sidespray 200, volume control valve 36 having a multi-component rotationally stationary body 90 is replaced with a volume control valve 202 having a unitary single piece rotationally stationary body 204. Rotationally stationary body 204 has as an integral unitary component a rotationally stationary disk 206 having planar surface 94 and second opening(s) 96. Rotationally stationary disk 206 of rotationally stationary body 204 is held in contact with rotational disk 72 of rotary body 70 by a nozzle body 208 and rubber washer 210. More particularly, nozzle body 208 is configured to fixedly engage side wall 48 of sidespray housing 38, e.g., by snap engagement, threaded engagement, etc., thereby restraining the stacked arrangement of rotary body 70 and rotationally stationary body 204 from movement in water flow direction 53.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sidespray for use with a water faucet unit, comprising:

a trigger valve configured to define a full-ON water flow condition and a full-OFF water flow condition for said sidespray;

a diverter actuator coupled to said trigger valve to select between said full-ON water flow condition and said full-OFF water flow condition for said sidespray;

a volume control valve configured to define a volume-variable water passageway to limit a water flow volume through said sidespray when said trigger valve has set said sidespray to said full-ON water flow condition; and a volume control actuator coupled to said volume control valve to selectively adjust said water flow volume through said sidespray.

2. The sidespray of claim 1, said sidespray having a sidespray housing, and wherein said volume control valve includes:

a rotary body having a rotational disk and a hub, said rotary body being rotatably mounted to said sidespray housing via said hub, said rotational disk having a first opening, said volume control actuator being coupled to said hub to effect rotation of said rotational disk relative to said sidespray housing; and a rotationally stationary body including a rotationally stationary disk having a second opening, said rotationally stationary disk being positioned adjacent to said rotational disk of said rotary body, said first opening of said rotational disk and said second opening of said rotationally stationary disk cooperating to define said volume-variable water passageway.

3. The sidespray of claim 2, wherein a volume of water flowing through said volume variable water passageway is varied based on an amount of area overlap between said first opening of said rotational disk and said second opening of said rotationally stationary disk, and said amount of area overlap being dependent of a rotational position of said rotary body relative to said rotationally stationary body.

4. The sidespray of claim 2, wherein each of said first opening of said rotational disk and said second opening of said rotationally stationary disk is formed as at least one arcuate slot.

5. The sidespray of claim 2, wherein said sidespray housing includes a cylindrical housing having an end wall and having an axle extending from said end wall along an axis of said cylindrical housing, said hub of said rotary body being received in said cylindrical housing and rotatably engaged with said axle, wherein said hub includes an elongated central opening having a complementary shape with the axle to receive the axle in the central opening.

6. The sidespray of claim 2, wherein said rotationally stationary body includes:

a holder body configured to orientate said rotationally stationary disk relative to said rotational disk, said holder body including a cylindrical bearing surface for radially supporting a distal portion of said rotary body having said rotational disk; and a biasing member positioned between said holder body and said rotationally stationary disk to bias said rotationally stationary disk in contact with said rotational disk.

7. A sidespray for use with a water faucet unit, comprising:

a sidespray housing having a proximal end, a distal end, and a side wall that extends between said proximal end and said distal end, said side wall defining a first chamber, and side wall having a side opening extending through said side wall to said first chamber, said proximal end being configured to accommodate fluid communication with said water faucet unit;

a nozzle coupled to said first chamber at said distal end of said sidespray housing;

a volume control actuator positioned to extend through said side opening in said side wall to be accessible at an exterior of said sidespray housing, wherein the volume control actuator includes a key slot; and a volume control valve positioned in said first chamber of said sidespray housing, said volume control valve including:

a rotary body positioned in said first chamber, said rotary body including a rotational disk and a hub with a radially extending key dimensioned to be received in the key slot, said rotary body being rotatably mounted to said sidespray housing via said hub, said rotational disk having a first opening, said volume control actuator being coupled to said hub via the key slot and key connection to effect rotation of said rotational disk relative to said sidespray housing; and a rotationally stationary body positioned in said first chamber, said rotationally stationary body including a rotationally stationary disk having a second opening, said rotationally stationary disk being positioned adjacent to said rotational disk of said rotary body, said first opening of said rotational disk and said second opening of said rotationally stationary disk cooperating to define a volume-variable water passageway.

8. The sidespray of claim 7, wherein a volume of water flowing through said volume-variable water passageway is varied based on an amount of area overlap between said first opening of said rotational disk and said second opening of said rotationally stationary disk, and said amount of area overlap being dependent of a rotational position of said rotary body relative to said rotationally stationary body.

9. The sidespray of claim 7, wherein each of said first opening of said rotational disk and said second opening of said rotationally stationary disk is formed as at least one arcuate slot.

10. The sidespray of claim 7, wherein said sidespray housing includes a cylindrical housing located in said first chamber, said cylindrical housing having an end wall and having an axle extending from said end wall along an axis of said cylindrical housing, said hub of said rotary body being received in said cylindrical housing and rotatably engaged with said axle.

11. The sidespray of claim 10, further comprising an o-ring seal positioned between said cylindrical housing and said hub of said rotary body.

12. The sidespray of claim 7, further comprising:

a second chamber located between said first chamber and said proximal end; and a trigger valve located in said second chamber, said trigger valve being configured for coupling to a diverter valve of said water faucet unit to selectively effect a flow of water to said volume control valve.

13. The sidespray of claim 12, wherein said water faucet unit includes a water mixing assembly coupled to each of a faucet spout and said sidespray via a diverter valve, said sidespray selectively receiving a mixed water flow from said water mixing assembly via said diverter valve, said diverter valve diverting said mixed water flow to said volume control valve through said trigger valve when said diverter valve is actuated by operation of said bigger valve.

14. The sidespray of claim 7, wherein said rotationally stationary body includes:

a holder body positioned in said first chamber to orientate said rotationally stationary disk relative to said rotational disk, said holder body including a cylindrical bearing surface for radially supporting a distal portion of said rotary body having said rotational disk; and a biasing member positioned between said holder body and said rotationally stationary disk to bias said rotationally stationary disk in contact with said rotational disk.

15. The sidespray of claim 14, further comprising an o-ring seal positioned between said side wall of said sidespray housing and said holder body.

16. The sidespray of claim 15, further comprising:

a cylindrical retainer located at said distal end of said sidespray body to restrain axial movement of said nozzle, said rotary member, said rotationally stationary member and said holder body, said cylindrical retainer being configured for coupling to said side wall of said sidespray body; and an o-ring seal positioned between said cylindrical retainer and said holder body.

17. A water faucet system, comprising:

a water faucet unit including a water mixing assembly and a faucet spout; and a sidespray coupled in fluid communication with said water mixing assembly, said sidespray including:

a trigger valve configured to define a full-ON water flow condition and a full-OFF water flow condition for said sidespray;

a diverter actuator coupled to said trigger valve to select between said full-ON water flow condition and said full-OFF water flow condition for said sidespray;

a volume control valve configured to define a volume-variable water passageway to limit a water flow volume through said sidespray when said trigger valve has set said sidespray to the full-ON water flow condition; and a volume control actuator coupled to said volume control valve to selectively adjust said water flow volume through said sidespray.

18. The water faucet system of claim 17, said sidespray having a sidespray housing, and wherein said volume control valve includes:

a rotary body having a rotational disk and a hub, said rotary body being rotatably mounted to said sidespray housing via said hub, said rotational disk having a first opening, said volume control actuator being coupled to said hub to effect rotation of said rotational disk relative to said sidespray housing; and a rotationally stationary body including a rotationally stationary disk having a second opening, said rotationally stationary disk being positioned adjacent to said rotational disk of said rotary body, said first opening of said rotational disk and said second opening of said rotationally stationary disk cooperating to define said volume-variable water passageway.

19. A water faucet system, comprising:

a water faucet unit including a water mixing assembly, a diverter valve, and a faucet spout; and a sidespray coupled in fluid communication with said water mixing assembly, said sidespray including:

a sidespray housing having a proximal end, a distal end, and a side wall that extends between said proximal end and said distal end, said side wall defining a first chamber, and side wall having a side opening extending through said side wall to said first chamber, said proximal end being configured to accommodate fluid communication with said water faucet unit;

a nozzle coupled to said first chamber at said distal end of said sidespray housing;

a volume control actuator positioned to extend through said side opening in said side wall to be accessible at an exterior of said sidespray housing; and a volume control valve positioned in said first chamber of said sidespray housing, said volume control valve including:

a rotary body positioned in said first chamber, said rotary body including a rotational disk and a hub, said rotary body being rotatably mounted to said sidespray housing via said hub, said rotational disk having a first opening, said volume control actuator being coupled to said hub to effect rotation of said rotational disk relative to said sidespray housing; and a rotationally stationary body positioned in said first chamber, said rotationally stationary body including a rotationally stationary disk having a second opening, said rotationally stationary disk being positioned adjacent to said rotational disk of said rotary body, said first opening of said rotational disk and said second opening of said rotationally stationary disk cooperating to define a volume-variable water passageway.

20. The water faucet system of claim 19, wherein a volume of water flowing through said volume-variable water passageway is varied based on an amount of area overlap between said first opening of said rotational disk and said second opening of said rotationally stationary disk, and said amount of area overlap being dependent of a rotational position of said rotary body relative to said rotationally stationary body.

21. The water faucet system of claim 19, wherein each of said first opening of said rotational disk and said second opening of said rotationally stationary disk is formed as at least one arcuate slot.

22. The water faucet system of claim 19, wherein said sidespray housing includes a cylindrical housing located in said first chamber, said cylindrical housing having an end wall and having an axle extending from said end wall along an axis of said cylindrical housing, said hub of said rotary body being received in said cylindrical housing and rotatably engaged with said axle.

23. The water faucet system of claim 22, further comprising an o-ring seal positioned between said cylindrical housing and said hub of said rotary body.

24. The water faucet system of claim 19, further comprising:

a second chamber located between said first chamber and said proximal end; and a trigger valve located in said second chamber, said trigger valve being configured for coupling to said diverter valve of said water faucet unit to selectively effect a flow of water to said volume control valve.

25. The water faucet system of claim 19, wherein said rotationally stationary body includes:

a holder body positioned in said first chamber to orientate said rotationally stationary disk relative to said rotational disk, said holder body including a cylindrical bearing surface for radially supporting a distal portion of said rotary body having said rotational disk; and a biasing member positioned between said holder body and said rotationally stationary disk to bias said rotationally stationary disk in contact with said rotational disk.

26. The water faucet system of claim 25, further comprising an o-ring seal positioned between said side wall of said sidespray housing and said holder body.

27. The water faucet system of claim 25, further comprising:

a cylindrical retainer located at said distal end of said sidespray body to restrain axial movement of said nozzle, said rotary member, said rotationally stationary member and said holder body, said cylindrical retainer being configured for coupling to said side wall of said sidespray body; and an o-ring seal positioned between said cylindrical retainer and said holder body.

28. The water faucet system of claim 19, wherein said water mixing assembly is coupled to each of a faucet spout and said sidespray via said diverter valve, said sidespray selectively receiving a mixed water flow from said water mixing assembly via said diverter valve, said diverter valve diverting said mixed water flow to said volume control valve when said diverter valve is actuated.

* * * * *